Figure 3:
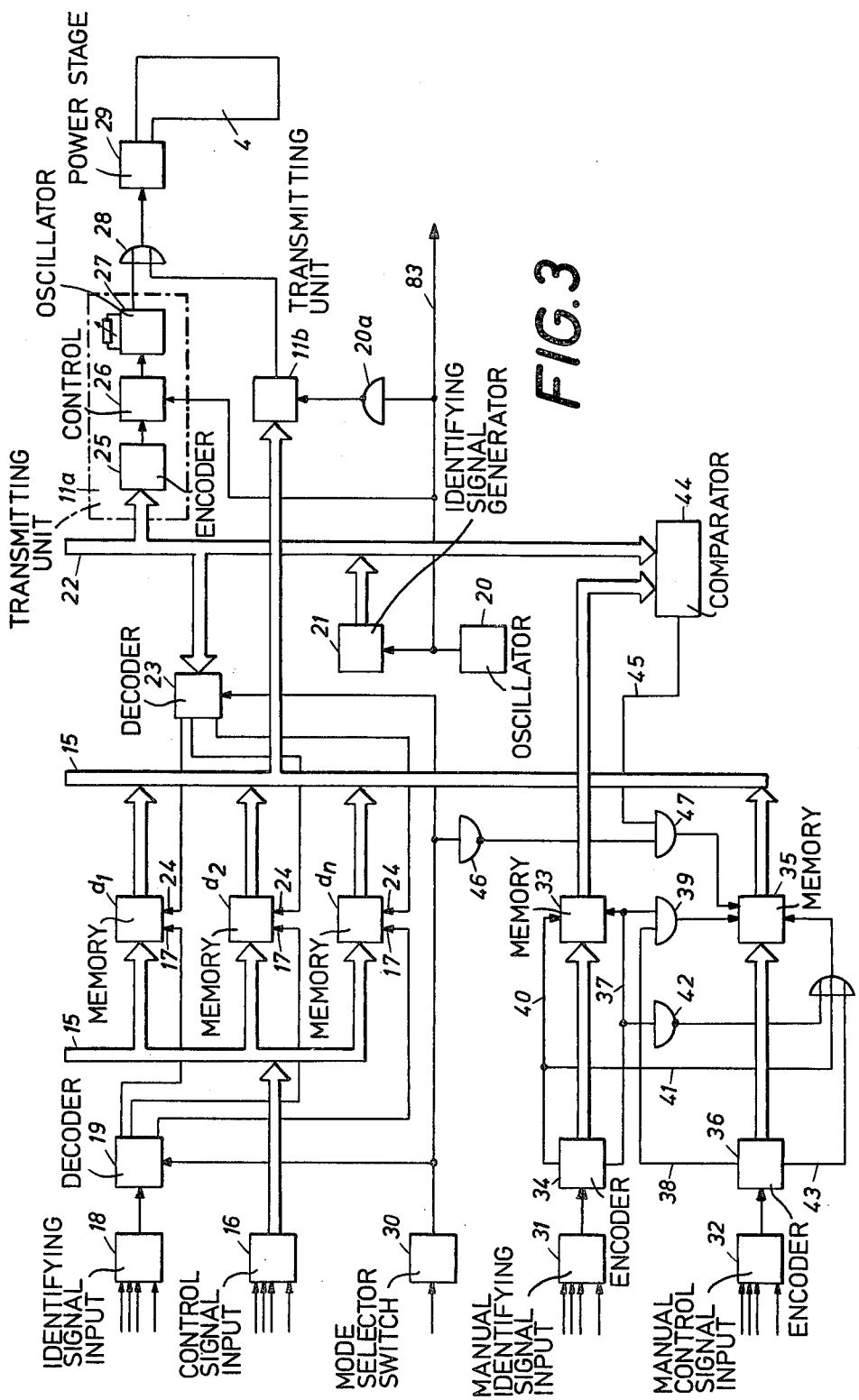

United States Patent [19]

Gidl

[11] Patent Number: 4,471,356
[45] Date of Patent: Sep. 11, 1984

[54] SIGNAL MESSAGE TRANSMITTING SYSTEM FOR A SUCCESSION OF MOBILE UNITS

[75] Inventor: Günter Gidl, Linz, Austria

[73] Assignee: Voest-Alpine Aktiengesellschaft, Linz, Austria

[21] Appl. No.: 313,605

[22] Filed: Oct. 21, 1981

[30] Foreign Application Priority Data

Dec. 1, 1980 [AT] Austria ................... 5846/80

[51] Int. Cl.³ .................... G08G 1/12; B66B 3/02; B61L 25/00
[52] U.S. Cl. .................... 340/989; 246/122 R; 246/63 R; 340/21; 340/825.54
[58] Field of Search ........... 340/23, 21, 504, 505, 340/825.54, 989; 246/122 R, 63 R, 63 C, 34 R, 34 CT, 187 B; 343/6.5 SS

[56] References Cited

U.S. PATENT DOCUMENTS

| | | | |
|---|---|---|---|
| 2,753,550 | 7/1956 | Treharne | 340/825.54 |
| 3,740,549 | 6/1973 | Thorne-Booth | 246/122 R |
| 3,771,119 | 11/1973 | Evans | 246/122 R |

FOREIGN PATENT DOCUMENTS 2402932 7/1975 Fed. Rep. of Germany .
2728765 11/1978 Fed. Rep. of Germany .

Primary Examiner—James J. Groody
Attorney, Agent, or Firm—Kurt Kelman

[57] ABSTRACT

A stationary transmitting and receiving station includes a transmitting section which is connected to an elongated induction loop and operable to transmit signal messages including identifying code signals to said induction loop, and a receiving section adapted to receive acknowledgements. A plurality of mobile units are movable along said induction loop and comprise each a receiver inductively coupled to said induction loop and adapted to receive from said induction loop signal messages which include a code signal identifying said mobile unit, and a transmitter operable to transmit an acknowledgment in response to the reception of such signal message by said receiver. A plurality of acknowledgment loops extend along respective length portions of said induction loop and are inductively coupled to said transmitters of all said movable units. Said receiving section comprises a plurality of receiving units, each of which is connected to one of said acknowledgment loops and adapted to receive said acknowledgment therefrom.

9 Claims, 6 Drawing Figures

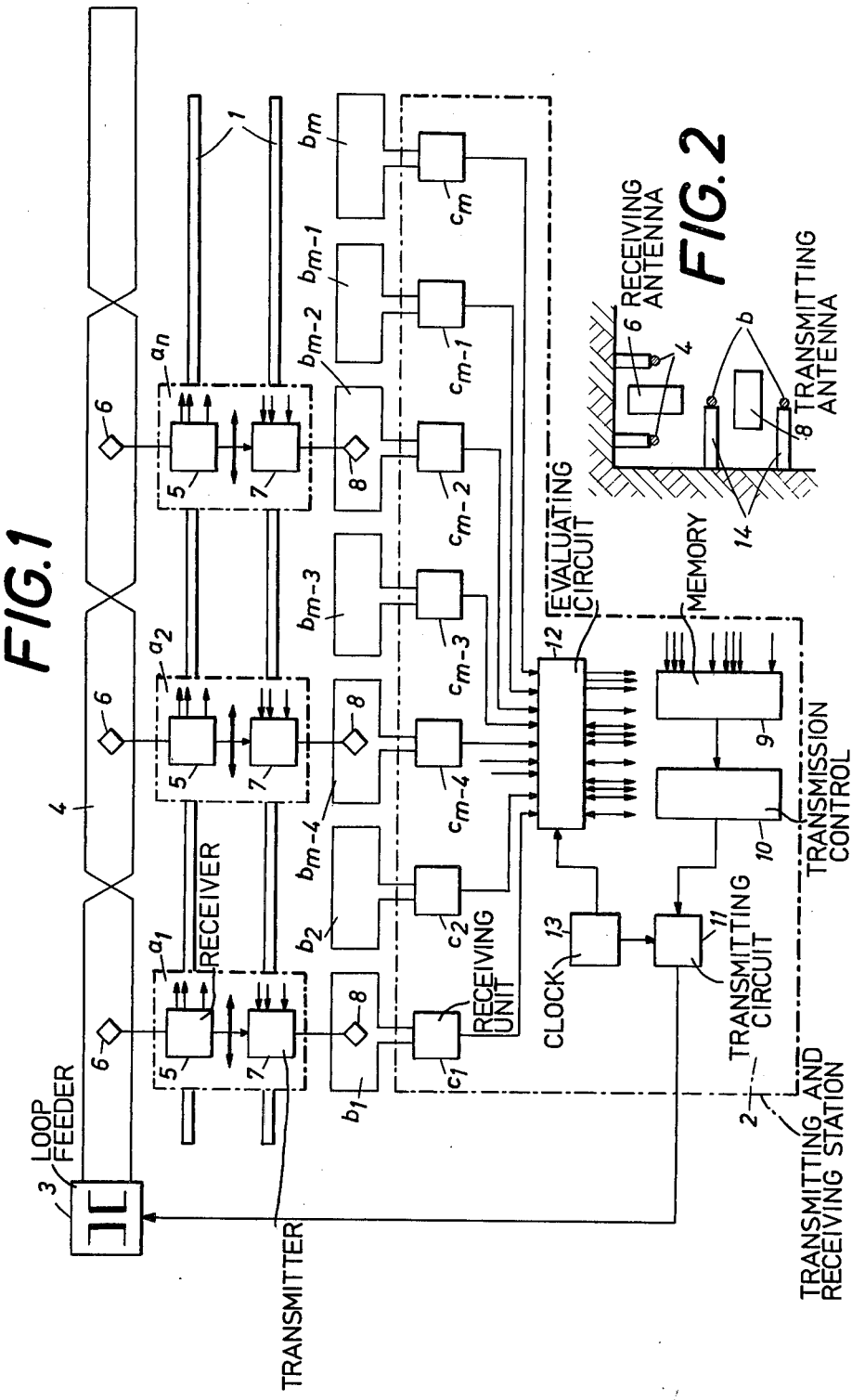

SIGNAL MESSAGE TRANSMITTING SYSTEM FOR A SUCCESSION OF MOBILE UNITS

This invention relates to a system for transmitting signal messages by inductive coupling between a stationary transmitting and receiving station and individual mobile units, which consist of conveying elements and are movable on a path of travel along an induction loop connected to the transmitting and receiving station. Each mobile unit comprises a transmitter and a receiver which responds only to signal messages that include a code signal identifying the respective conveyor element.

In known systems for transmitting signal messages by inductive coupling, only one induction loop extends along the path of travel and must be operated in a multiplex mode, e.g., a plurality of carrier frequencies are used and are modulated with the signal message to be transmitted from the transmitting and receiving station to the conveyor elements and from the latter to the transmitting and receiving station. But frequency modulation is highly susceptible to interference and is expensive.

If only low transmission rates are required, a plurality of frequency channels may be provided in the voice frequency range and commands may be transmitted in the form of pulse messages. In such a system, a different frequency may be associated with each conveying element. If the same frequency is used for all conveying elements, a message can be transmitted to a selected conveying element if the receiver of each conveying element responds only to a code signal which identifies the selected conveying element. That known transmission system is relatively inexpensive because no carrier frequency is employed but the transmission rate that can be achieved is relatively small.

All known systems for transmitting signal messages by inductive coupling have also the disadvantage that the acknowledgments transmitted from the mobile conveying elements to the stationary transmitting and receiving station do not contain information on the instantaneous position of the transmitting conveying element. The position of the conveying elements usually can be detected only by distance measurements, which are effected, e.g., by a counting of distance marks. Such a counting of distance marks is expensive. That disadvantage cannot be avoided if the positions of the conveying elements are detected by another known method, in which detectors are provided along the path of travel and indicate the passage of each conveying element.

It is an object of the invention to avoid these disadvantages and so to improve a system of the kind described hereinbefore for transmitting signal messages between a stationary transmitting and receiving station and individual conveying elements that the positions of the several conveying elements are indicated during the transmission of the signal messages.

This object is accomplished according to the invention with an induction loop which extends throughout the length of the path of travel and constitutes a transmitting loop connected to a transmitting section of the transmitting and receiving station. A receiving section of the station includes a plurality of receiving units connected to respective acknowledgment loops, which extend along respective sections of the path of travel.

Because acknowledgment loops are associated with respective sections of the path of travel, the position of the conveying element transmitting an acknowledgment can be detected in a simple manner as the acknowledgment can be received only by the acknowledgment loop which is adjacent to the transmitting conveying element. Besides, signals can be transmitted in both directions entirely independently of each other and, as a result, the transmission rate can be greatly increased. For this reason, signal messages can be transmitted at audiofrequencies.

As it is desired to operate the transmitting loop and the acknowledgment loops at the same frequency, crosstalk between the loops must be suppressed. This can be ensured in a particularly simple manner without special shields by positioning the transmitting loop, on the one hand, and the acknowledgment loops, on the other hand, in planes that are at right angles to each other, at least one of said planes including the longitudinal axis of the loop which is included the other plane. In that arrangement, the transmitting loop, on the one hand, and the acknowledgment loops, on the other hand, are centered on and at right angles to each other so that the magnetic field generated by one loop cannot induce a voltage in the other loop and crosstalk will thus be effectively suppressed. It need not be explained in detail that the transmitting and receiving antennas of the conveying elements must be properly arranged relative to each other and to the loops.

Particularly simple conditions for the detection of the positions of the conveying elements will be obtained if it is ensured that only one conveying element can be disposed at a time adjacent to each acknowledgment loop. For this purpose each acknowledgement loop has preferably a length which equals the length of a conveying element. This feature will ensure that the positions of the conveying elements will be monitored continuously throughout the length of the path of travel and that only one acknowledgment can be transmitted at a time via each acknowledgment loop.

Each conveying element is activated by a code signal that is included in the signal message transmitted by the stationary transmitting and receiving station and identifies the conveying element. Similarly, the acknowledgment transmitted by a conveying element could include the code signal which identifies the conveying element so that the stationary transmitting and receiving station receives an indication of the conveying element transmitting the acknowledgment being received. But such an arrangement would involve a higher expenditure and a longer transmission time because the identifying code signal would add to the length of the acknowledgment. In accordance with a preferred further feature of the invention, that expenditure is avoided by connecting the receiving units included in the transmitting and receiving station and connected to respective acknowledgment loops to an evaluating circuit which is connected to an identifying signal generator. The identifying signals are applied by the identifying signal generator to signal message-generating means which are included in the transmitting section of the stationary transmitting and receiving station and in which said identifying signals are converted into code signals to be included in respective signal messages and identifying the conveying station to which each signal message is to be transmitted. These identifying signals generated by the identifying signal generator are applied to the evaluating circuit in the sequence in which said identifying code signals are generated but with a time delay relative thereto and are combined in the evaluating circuit with respective acknowledgments, which have been received by respective receiving elements and have been transmitted by the conveying elements to which the respective signal messages have been transmitted. If such an arrangement is adapted and a fixed time delay from the receipt of a signal message by a conveying element and the transmission of the corresponding acknowledgment is ensured, a code signal identifying the conveying element need not be included in the acknowledgment. If the identification that is transmitted as a code signal by the transmitting section to the transmitting loop is made available to the evaluating circuit with a proper time delay, the acknowledgment received by one of the receiving units via an acknowledgment loop can be associated with the proper identifying signal. This may be ensured by connecting the identifying signal generator of the transmitting section of the transmitting and receiving station to the evaluating circuit by a delay line or by including in the evaluating circuit a separate identifying signal generator which is properly timed. Whereas the several conveying stations might be arbitrarily activated under the control of the transmitting and receiving station, a much simpler arrangement will be obtained if all conveying elements are activated in succession in a cyclic sequence. Such a cyclic activation will be recommendable because a short cycle time will be sufficient.

In dependence on the nature and use of the conveying elements, it may be desirable to supervise the several acknowledgment loops or the several conveying elements. If it is desired to supervise the acknowledgment loops and associated sections of the path of travel as regards the adjacent conveying elements, the evaluating circuit may preferably include for each receiving unit an identification memory that is connected to the identifying signal generator and has a read-in control terminal, which is connected to a control command generator that is adapted to be activated by the associated receiving unit. The evaluating circuit may also provide an inquiry unit which is connected to the read-out control terminals of the identifying signal memories and to the read-out command control terminals of the acknowledgment memories associated with respective receiving units. As the input terminals of all identification memories are connected to the output terminal of the identifying signal generator so that the signal identifying a conveying element that is transmitting at a time will be offered to all memories, a read-in command initiated by the receiving unit which receives the acknowledgment may be used to activate the memory which is associated with that receiving unit so that the identifying signal offered to all memories will be read only into that memory. Each memory can then be selected and read out by means of a suitable inquiry unit to obtain the signal that identifies the conveying element disposed at the selected acknowledgment loop, and also to obtain the acknowledgment which has been transmitted by said conveying element and is read by the inquiry unit out of the acknowledgment memory associated with the selected receiving unit. As a result, the signals identifying all conveying elements will be stored in the memories which are associated via the acknowledgment loops with respective sections of the path of travel after the transmitting section has cyclically selected all conveying elements, and said identifying signals can subsequently be read out of said memories.

In a modified system, the evaluating circuit comprises memories associated with respective conveying elements and adapted to store the received acknowledgments, each receiving unit has associated with it an output unit which is adapted to be activated by the associated receiving unit and to deliver to the latter a code signal which identifies said receiving unit, each acknowledgment memory has associated with it a code signal memory which is connected to the output units, and the read-in control terminals of the code signal memories and the acknowledgment memories are connected to the identifying signal generator in step with the delivery of the identifying signals. In that modified system, the conveying elements are selected in succession and it is inquired at what acknowledgment loop the presently selected conveying element is disposed. In response to the reception of an acknowledgment by a given receiving unit, the latter will communicate a code signal identifying said receiving unit and the associated acknowledgment loop to all code signal memories but said code signal will be stored only in the code signal memory to which a read-in command derived from the identifying signal generator is presented. Because the read-in commands are cyclically delivered to the code signal memories, each code signal memory will be definitely associated with a specific conveying element so that the contents of an acknowledgment memory associated with a conveying element and of a code signal memory associated with the receiving unit which is receiving said acknowledgment will relate to that conveying element and the position of said conveying element and the acknowledgment transmitted by it can be obtained by an interrogation of the memories which are associated with that conveying element.

In order to avoid errors in transmission, a further preferred feature of the invention provides in that each receiving unit is connected to a monitoring device which checks whether an acknowledgment has been received within a predetermined time and which is connected to an erase terminal of the associated acknowledgment memory. The operation of that monitoring device is based on a rigid time relation between the signal messages received by the conveying means and the acknowledgments transmitted in response to said signal messages and will generate a signal when an acknowledgment has not been received within the predetermined time. That signal will indicate either that no conveying element is positioned at the associated acknowledgment loop or that the transmission is disturbed. In both cases, the contents of the associated acknowledgment memory must be erased.

Because the conveying elements are successively activated in a cyclic sequence and there is a fixed time delay from a signal message transmitted by the transmitting section of the stationary station to the corresponding acknowledgment so that only one acknowledgment can be received at a time during proper operation, a simultaneous reception of more than one acknowledgment or the nonreception of an acknowledgment message should result in an error signal. For this purpose the evaluating circuit may include an error detector having an input terminal which is connected by a modified OR gate to all receiving units of the transmitting and receiving station and an output terminal which is connected to an error indicator. Said modified OR gate is conducting only when only one of its inputs is high. If no signal or more than one signal indicating the reception of an acknowledgment is applied to the modified OR gate, then no reception will be indicated to the error detector and an error will be indicated. That indication of an error can be utilized in an advantageous manner, e.g., to erase the contents of the identification memories associated with the several receiving units when acknowledgments have been received by, e.g., two receiving units. For this purpose the erase input terminals of the identification memories are connected to the output terminal of an AND gate which receives the inverted output of the error detector and the output of the monitoring device associated with the respective receiving unit. Because the AND gate receives the inverted output of the error detector, the inverted signal applied to the AND gate in case of a detection of an error will correspond to the no-error output of the monitoring device which is associated with the receiving unit which is properly receiving an acknowledgment. As a result, the code signal that has been read into the associated memory will be erased because the higher-ranking reception-monitoring circuit has reported an error.

If the read-in control terminal of each identifying signal generator is connected by an OR gate to the associated control command generator and to an AND gate which is connected to the monitoring device associated with the respective receiving unit and to the output terminal of the error detector, the erase command delivered by the monitoring device associated with a receiving unit can be used to initiate a storage of the identifying signal during which the error occurs so that the conveying element which is identified by said signal and error-involving transmission can be detected.

In case of an indication of an error, a storage of received acknowledgments and of code signals identifying the corresponding receiving units in the memories provided for that purpose and associated with respective conveying elements can be prevented in a similar manner. If the read-in control terminals of the acknowledgment memories and of the code signal memories are connected by an AND gate receiving the inverted output of the error detector and to the associated output of the identifying signal generator having a separate output terminal for each identifying signal, a control command cannot be delivered to the read-in control terminals of the memories when the error detector has detected an error-involving reception. When the error detector has not detected an error, the inverted output of the error detector will cause control signals to be applied to those input terminals of the AND gate which are associated with the memories that have been activated by means of the identifying signal generator.

In case of a transmission error, the error-indicating output of the error detector may be used to indicate the conveying element which initiates the transmission error. For this purpose the output terminal of the error detector is connected to the read-in control input terminal of an identification memory that is connected to the identifying signal generator.

Figure 4:
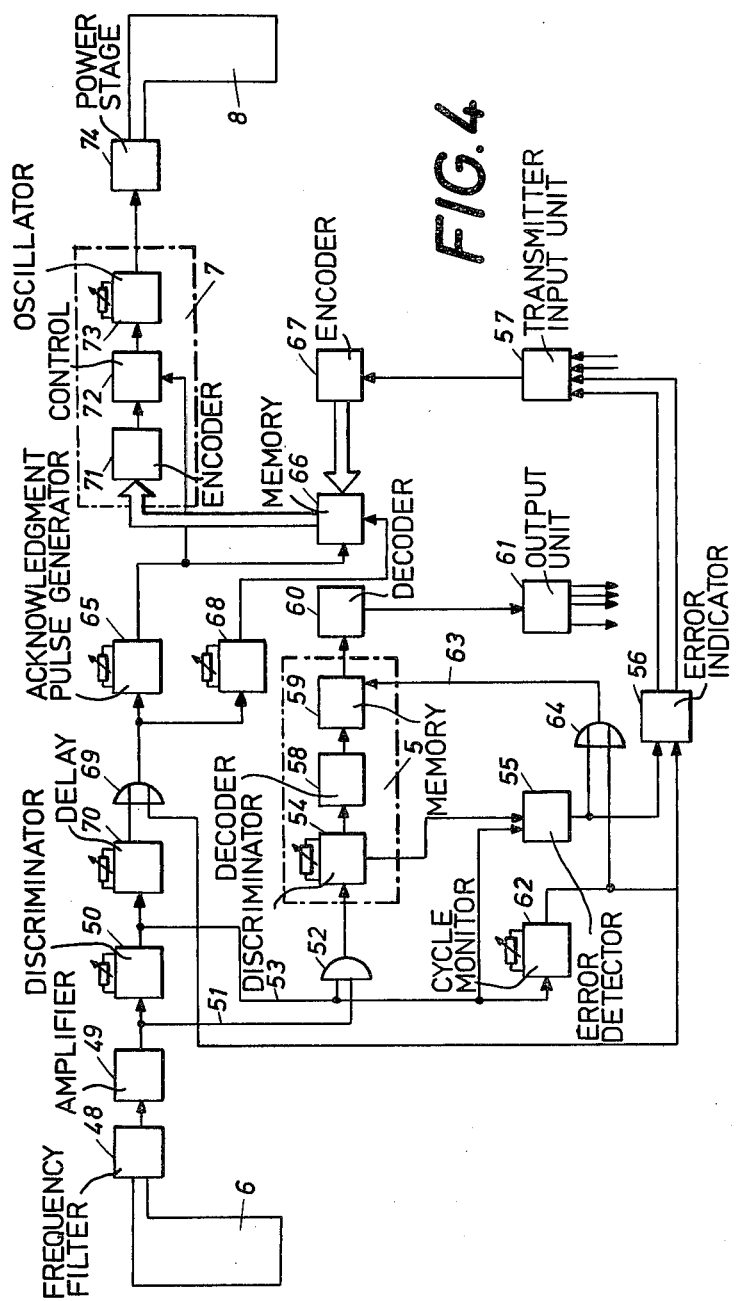
Figure 5:
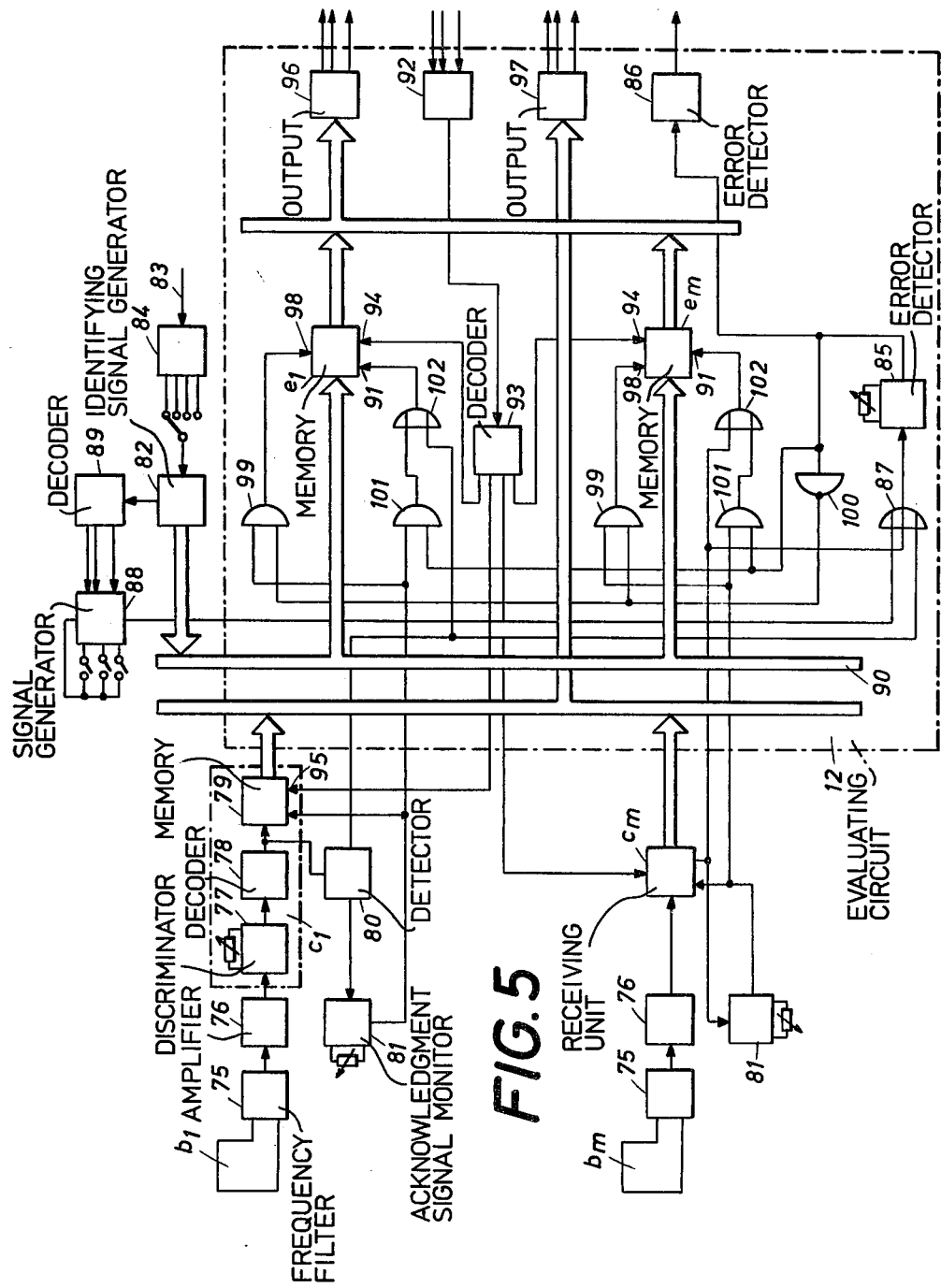
Figure 6:
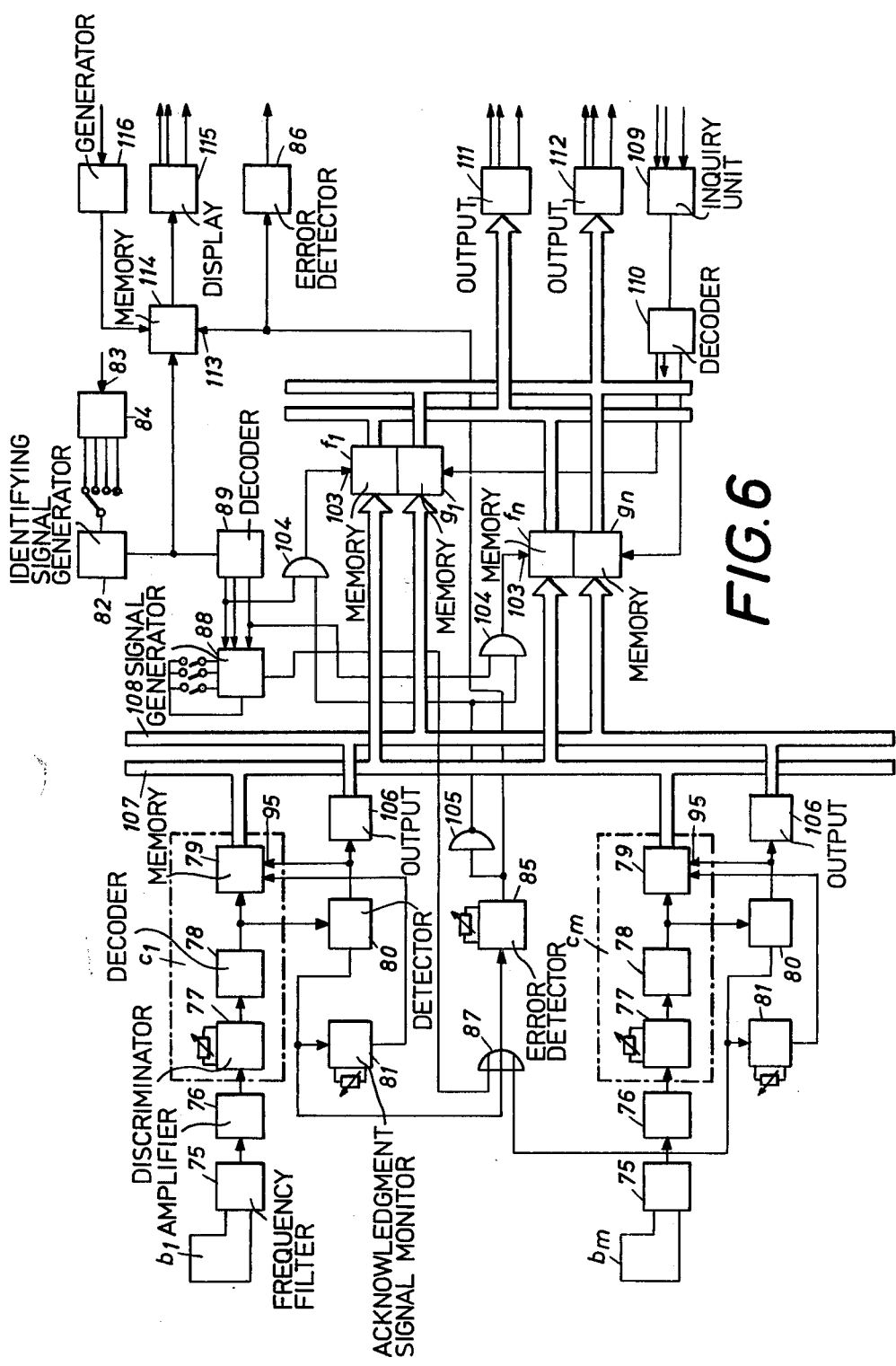

An embodiment of the invention is shown diagrammatically and by way of example on the accompanying drawings, in which FIG. 1 is a simplified block circuit diagram showing a system which embodies the invention and serves to transmit signal messages between a stationary transmitting and receiving station and several conveying elements, FIG. 2 is a sectional view showing the arrangement of the transmitting loop in relation to an acknowledgment loop, FIG. 3 is a block circuit diagram showing the transmitting section of the stationary transmitting and receiving station, FIG. 4 is a block circuit diagram showing the transmitter and receiver of a conveying element, FIG. 5 is a block circuit diagram showing an embodiment of the receiving section of the transmitting and receiving station, and FIG. 6 is a block circuit diagram showing a modification of the receiving section.

FIG. 1 shows a conveyor, e.g., of a pickling plant. The conveying elements a which receive the material to be pickled must be moved along a path of travel defined by a track 1. A stationary transmitting and receiving station 2 serves to control the conveying elements a by means of control commands consisting of signal messages delivered by a loop feeder 3 to an induction loop 4 which extends along the path of travel 1 and serves as a transmitting loop. For the reception of said signal messages, each conveying element a comprises a receiver 5 having a receiving antenna 6, which is magnetically coupled to the induction loop 4 so that voltages at the frequency of the signal message are induced in the receiving antenna 6. In response to the reception of a signal message, each receiver 5 activates a transmitter 7 carried by the same conveying element a and transmitting an acknowledgment when a predetermined time has elapsed after the reception of the signal message. For the transmission of that acknowledgment, acknowledgment loops b are provided, which extend along the path of travel 1. The transmitting and receiving station 2 includes receiving units c connected to respective acknowledgment loops b. As each conveying element a has the same length as an acknowledgment loop b, the transmitting antenna 8 of only one conveying element a can be disposed at a given acknowledgment loop b so that only one acknowledgment can be received at a time via a given acknowledgment loop b. This means that the reception of an acknowledgment by a receiving unit c will indicate that the conveying element a which is transmitting the acknowledgment is disposed at the acknowledgment loop b that is connected to the receiving unit c which is receiving the acknowledgment. The positions of the conveying elements a can then be detected if the conveying elements are properly identified. For this purpose, an identification must be provided for each conveying element a and may consist, e.g., of a consecutive number. In that case the n-th conveying element will be identified by the consecutive number n and will be designated hereinafter as the conveying element $a_n$.

To permit a selection of each conveying element from the transmitting and receiving station 2, each receiver 5 is designed to respond only to a code signal which identifies the corresponding conveying element; that code signal may consist of the encoded identification of that conveying element. For this reason the signal message transmitted to each conveying element a must consist of two parts, one of which is a code signal that identifies the selected conveying element and the other of which constitutes a control signal. If each signal message consists of a succession of series of oscillations and each series of oscillations differs in frequency from the preceding series of oscillations, a large number of code words can be transmitted as a small number of series of oscillations at a small number of frequencies. Because each signal message consists of two parts, each signal message to be delivered to a given conveying element must consist of two code words. In order to permit a selection of the several conveying elements in a cyclic sequence with a short cycle time, the signal messages to be transmitted may be encoded and then read into a signal message memory 9 and by a transmission control 10 can be read in a predetermined sequence from the memory 9 and delivered to a transmitting circuit arrangement 11.

When a receiver 5 of a given conveying element has received a transmitted signal message, the message is decoded and stored in said conveying element and an acknowledgment is then transmitted by the transmitter 7 of the conveying element. That acknowledgment may also consist of two code words. As the coveying elements a are selected in a cyclic sequence by the transmitting and receiving station 2 and each conveying element transmits an acknowledgment after the reception of each signal message, there is a fixed time relation between the acknowledgment cycle and the signal message cycle so that the acknowledgment need not contain an identifying code signal if an evaluating circuit 12 is connected to all receiving units c and adapted to add to each acknowledgment the identification of the conveying element which is transmitting said acknowledgment. For this purpose it is sufficient to deliver to the evaluating circuit 12 the identifying signals in the same sequence as in the signal message cycle but with a time delay corresponding to the interval of time between the reception of the signal message and the transmission of a acknowledgment by a given conveying element. To maintain a predetermined time relation between the operations of the transmitting and receiving sections of the stationary transmitting and receiving station, a clock 13 is provided to control the timing of an identifying signal generator.

To preclude crosstalk between the transmitting loop 4 and the acknowledgment loops b, the latter are centered with respect to the transmitting loop and contained in a plane that is at right angles to the plane containing the transmitting loop 4. This is shown in FIG. 2. The acknowledgment loops b are secured to brackets 14 and lie in a plane that is at right angles to the plane of the transmitting loop and extends through the longitudinal axis of the transmitting loop. Similarly, the receiving and transmitting antennas 6 and 8 are so arranged relative to each other that a mutual influence need not be feared.

As is shown in FIG. 3, the transmitting section of the transmitting and receiving station 2 comprises control signal memories d associated with respective conveying elements and connected by a control signal bus 15 to a control signal input device 16. An input device 18 delivers identifying signals to the read-in control terminals 17 of the memories d. A decoder 19 will be required between the input device 18 and the input terminals 17 if the input device should receive encoded identifying signals from a control device. It is apparent that the control signal for the conveying element $a_n$ will be stored in the associated memory $d_n$ when the input device 18 has delivered the corresponding read-in command.

To permit the reading of the contents of the memories $d_1$ to $d_n$ in a cyclic sequence, an identifying signal generator is provided which, in the present embodiment, consists of a ring counter 21 connected to an oscillator 20. The clock pulses generated by the oscillator 20 are counted by the ring counter 21 so that the identifying code signal at the output of the ring counter 21 differs from clock pulse to clock pulse. These identifying code signals generated in a cyclic sequence are delivered by a data bus 22 to the transmitting unit 11a for transmitting the identifying code signal and are delivered by a decoder 23 to the read-out control terminals of the control signal memories d. As a result, the contents of the memories d are read in a cyclic succession and the control signals which have been read out are delivered by the data bus 15 to a transmitting unit 11b. The signals applied by the data buses 15 and 22 to the transmitting units 11a and 11b, respectively, are delivered by an encoder 25 to a control device 26 which, in dependence on the sequencing program called by the code word, controls a transmitter oscillator 27 so as to generate the signal message to be transmitted. The frequencies and the number of oscillations in each series thereof can be adjusted. The timing of the alternating operations of the two transmitting units 11a and 11b is controlled by the oscillator 20 because the control device 26 for the transmitting unit 11a is directly connected to the output terminal of the oscillator 20 and the corresponding control device for the transmitting unit 11b is connected to the output terminal of the oscillator 20 via an inverter 20a. The outputs of the transmitting units 11a and 11b are delivered by an OR gate 28 to a power stage 29 which feeds the transmitting loop 4.

To permit a transmission of control signals to the several conveying elements $a_1$ to $a_n$ under manual control, a mode selector switch 30 is provided, which can be operated to disable the decoders 19 and 23 for initiating the reading of the contents of the memories $d_1$ to $d_n$. Under the control of the hand-operated input device 31 for generating the identifying signals and the hand-operated input device 32 for generating the control signals, the identifying signal and the code signal can be stored. For this purpose, a memory 33 is provied for storing the identifying code signal delivered by an encoder 34 connected to the input device 31 and a memory 35 is provided for storing the control signal delivered by an encoder 36 connected to the input device 32. A control signal cannot be read into the memory 35 unless an identifying code signal is applied at the same time because the control signal lead 37 for delivering the read-in command to the memory 33 and the control lead 38 for the encoder 36 are connected to respective input terminals of an AND gate 39, the output terminal of which is connected to the read-in control terminal of the memory 35 so that a read-in command cannot be transmitted to the memory 35 unless both control leads 37 and 38 are high. When the identifying code signal is erased under the control of a signal transmitted by the control lead 40, the contents of the memory 35 will also be erased by a signal delivered by the branch lead 41. Unless an identifying code signal is read into the memory 33, the contents of the memory 35 will also be erased by the output signal of the inverter 42, connected to the read-in control lead 37. By a signal delivery via the control lead 43, the contents of the memory 35 can be erased independently of the storage of a signal in the memory 33.

The identifying code signal stored in the memory 33 is applied to a comparator 44, which compares the identifying code signal generated by hand with the identifying code signal instantaneously applied to the data bus 22 and delivers over the lead 45 a read-out command to the control signal memory 35. This operation can be performed only when the mode selector switch is in position for manual control. The output terminal of the mode selector switch 30 is connected by an inverter 46 to one input terminal of and AND gate 47, the other input terminal of which is connected by the control lead 45 to the output terminal of the comparator 44. As the contents of the memory 35 are read out, the control signal generated by hand is delivered via the data bus 15 to the transmitting unit 11b and then applied as a signal message to the transmitting loop 4.

In accordance with FIG. 4, the signal message delivered to the transmitting loop 4 is received by the receiving antennas 6 of the several conveying elements a and in each conveying element a is delivered via a frequency filter 48 and an amplifier 49 to a discriminator 50 which checks whether or not the received signal message contains the code signal which identifes the conveying element. If that code signal is detected, the discriminator will deliver a control signal via lead 51 to one input terminal of an AND gate 52, the other input terminal of which is connected to the output terminal of the amplifier 49 and the output terminal of which is connected to the receiver 5 of the conveying element. The receiver 5 contains another discriminator 54 which checks whether the received control signal is complete and whether it constitutes one of the control signals to which that conveying element is responsive. When an error is detected by the discriminator 54, the latter will deliver a signal to an error detector 55. As a signal indicating the detection of the proper identifying code signal is also delivered to the error detector 55, the latter will respond to the non-detection of a proper control signal by the delivery of an error signal to the error indicator 56 connected to the input unit 57 for the transmitter 7 of the conveying element. As a result, the error signal can be received also by the transmitting and receiving station 2.

If the discriminator 54 detects a proper control signal, the received signal will be delivered via a decoder 58 to a signal memory 59 and can be read out from the memory 59 and then be delivered via a decoder 60 to an output unit 61.

As the several conveying elements are selected in a cyclic sequence so that each conveying element must be selected in each signal message cycle, a cycle-monitoring device 62 may be provided, which is fed with the output of the discriminator 50 and serves to check whether or not an identifying code signal has actually be detected within the predetermined cycle time. If no control signal has been delivered by the discriminator 50 within one cycle time, an error signal will be delivered to the error indicator 56 and the contents of the signal memory 59 will be erased in response to a signal delivered via the control lead 63. The contents of that memory will also be erased if a received control signal has not been recognized. For this purpose the control lead 63 is connected to the output terminal of an OR gate 64, the input terminals of which are respectively connected to the cycle-monitoring device 62 and to the error detector 55.

To permit an acknowledgment to be transmitted after a predetermined time has elapsed after the reception of a signal message, the discriminator 50 in response to the reception of a signal message delivers a control signal to an acknowledgment pulse generator 65 which, after a predetermined, adjustable time, delivers a read-out command to an acknowledgment memory 66 and activates the transmitter 7. The acknowledgment is prescribed by the input unit 57 and delivered by it via an encoder 67 to the memory 66. The storage of the acknowledgment in the memory 66 is controlled by a delay time 68 which ensures that the last message delivered to the input unit 57 is stored.

In case of a response of the cycle-monitoring device 62, the corresponding error message should also be transmitted. For this reason the input terminal of the acknowledgment control pulse generator 65 is connected to the output terminal of an OR gate 69, the input terminals of which are respectively connected to the output terminal of the discriminator 50 via a delay line 70 and to the output terminal of the cycle-monitoring device 62. The delay line 70 ensures that, during error-free operation, the acknowledgment control pulse will be generated at the same time as in case of a response of the cycle-monitoring device 62.

When the transmitter 7 has been activated and the contents of the memory 66 have been read out, a control circuit 72 will be activated via an encoder 71 to convert the encoded acknowledgment by means of a transmitter oscillator 73 to a corresponding sequence of series of oscillations at different frequencies. Said series of oscillations are delivered by a power stage 74 to the transmitting antenna 8.

As each of the conveying elements $a_1$ to $a_n$ can transmit its acknowledgment only to one of the acknowledgment loops b, the instantaneous position of the conveying element can be detected by the receiving units c connected to respective acknowledgment loops b. If the received acknowledgments are evaluated for this purpose, it will be sufficient to detect which receiving unit has received a given acknowledgment. For this purpose the consecutive numbers 1 to m are associated with the m acknowledgment loops and with the m receiving units which are provided. Accordingly, the acknowledgment loops have been designated $b_1$ to $b_m$ and the associated receiving units have been designated $c_1$ to $c_m$. An acknowledgment transmitted by an acknowledgement loop b will be delivered to the associated receiving unit c via a frequency filter 75 and an amplifier 76 and in the receiving unit will be checked in a discriminator 77 for errors. Unless the discriminator 77 detects an error, the received acknowledgment will be delivered via a decoder 78 to a signal memory 79. The received acknowledgment is also delivered to an acknowledgment detector 80 which delivers to a monitoring device 81 associated with the respective one of the receiving units $c_1$ to $c_m$ a signal indicating the reception of an acknowledgment. Unless that signal is received within the predetermined cycle time, the monitoring device 81 will erase the contents of the signal memory 79.

To ensure that each of the receiving units $c_1$ to $c_m$ can be associated with the conveying element transmitting the acknowledgment although the acknowledgment does not include an identifying code signal, identifying signals are delivered to the receiving units $c_1$ to $c_m$ desirably by an identifying signal generator comprising a ring counter 82 which counts the pulses delivered to it via a clock line 83 by the oscillator 20 of the transmitting section of the transmitting and receiving station 2. The identifying signal delivered by the ring counter after each clock pulse must be delayed relative to the signal message cycle so that the identifying signals will be applied to the evaluating circuit 12 in synchronism with the acknowledgments delivered by the respective conveying elements. That delay of the identifying signals can be effected in a simple manner by means of a shift register. The delay can be adjusted.

As there is a fixed time relation between the signal message and acknowledgment cycles, each of the receiving units $c_1$ to $c_m$ must receive one, and only one, acknowledgment per cycle. For this reason, an error detector 85 can be used to generate an error message which is delivered to an error indicator 86. The error detector 85 is connected to the output terminal of a modified OR gate 87 which is conductive only when only one of its inputs is high. Each acknowledgment detector 80 associated with a given one of the receiving units $c_1$ to $c_m$ has an output terminal connected to an associated input terminal of the modified OR gate 87 so that all control signals indicating the reception of an acknowledgment are delivered to the modified OR gate 87. The first of said control signals delivered during a cycle time to the modified OR gate 87 will be transmitted to the error detector 85. If no acknowledgment is received from a given conveying element within one cycle time or if two or more acknowledgments are received at the same time, the gate 87 will be blocked and an error signal will be generated.

To ensure that conveying elements which are not used cannot initiate an error message, a signal generator 88 is provided for each unused conveying element and is cyclically activated by means of the ring counter 82 via a decoder 89 to deliver in respect of the unused conveying element a reception-simulating signal to the modified OR gate 87. As a result, the proper reception of an acknowledgment from the unused conveying element is simulated to the error detector 85.

To permit at any time an indication which conveying element a is disposed at a given acknowledgment loop b, the evaluating circuit 12 shown in FIG. 5 has for each of the receiving units $c_1$ to $c_m$ an identification memory e. These memories e are designated by the same consecutive numbers as the associated receiving units so that the memory $e_m$ is associated with the receiving unit $c_m$. The identifying signals appearing at the output of the ring counter 82 are delivered by a data bus 90 to the data input terminals of the memories $e_1$ to $e_m$ and will be stored in these memories when the acknowledgment detector 80 delivers a read-in command to the read-in control terminals 91 of said memories $e_1$ to $e_m$. Because the time interval between the signal message cycle and the acknowledgment cycle agrees with the delay of the identifying signal delivered to the evaluating circuit, the identifying signal applied to each of the memories $e_1$ to $e_m$ will always indicate the conveying element from which an acknowledgment is being received by one of the receiving units $c_1$ to $c_m$. For this reason the identifications of all conveying elements must be contained in the memories $e_1$ to $e_m$ after each signal message cycle in which a single signal message has been delivered to each conveying element and the corresponding acknowledgment cycle. Each of said memories $e_1$ to $e_m$ is associated with, and specifically the identification of each of said conveying elements will be stored in, that of said memories $e_1$ to $e_m$ which is associated with the acknowledgment loop b at which the corresponding conveying element is presetly disposed. An inquiry unit may be operated to activate via a decoder 93 one of the identification memories $e_1$ to $e_m$ as well as the signal memory 79 of the corresponding receiving unit c so that read-out commands will be applied to the read-out control terminals 94 and 95 of the respective memories e and 79 and the output units 96 and 97 will indicate the conveying element disposed at the selected acknowledgment loop and the acknowledgment received from the indicated conveying element.

If the monitor 81 associated with a given receiving unit c indicates that no acknowledgment has been received by said unit during an acknowledgment cycle, the contents of the signal memory 79 and of the associated identification memory e will be erased unless the error detector 85 responds. For this purpose the erase input 98 of each identification memory e is connected to the output terminal of an AND gate 99 which has input terminals that are respectively connected to the monitoring device 81 associated with the corresponding receiving unit and via an inverter 100 to the output terminal of the error detector 85. When the error detector 85 detects an error, the erase command generated by the corresponding monitoring device 81 will be utilized to initiate the storage of the identification of the conveying element for which the error has been detected. For this purpose and AND gate 101 may be provided, which has input terminals respectively connected to the monitoring device 81 associated with the corresponding receiving unit and to the output terminal of the error detector 85 and which when open delivers a control signal via an OR gate 102 to the read-in control terminal 91. The read-in command from the acknowledgment detector 80 is also delivered via the OR gate 102.

In accordance with FIG. 6 the several conveying elements $a_1$ to $a_n$ are monitored as regards their positions on the path of travel rather than the acknowledgment loops $b_1$ to $b_m$ as regards the adjacent conveying elements $a_1$ to $a_n$. For this purpose, each of the conveying elements $a_1$ to $a_n$ has associated with it one of the acknowledgment memories $f_1$ to $f_n$ and one of the memories $g_1$ to $g_n$ for storing the consecutive numbers 1 to m of the acknowledgment loops $b_1$ to $b_m$. The acknowledgment received by each receiving unit c should be stored in that of the memories $f_1$ to $f_n$ in which the indentification of the conveying element a transmitting the acknowledgment is stored. To that end, the memories $f_1$ to $f_n$ and $g_1$ to $g_n$ are activated in succession in accordance with the acknowledgment sequence. For this purpose, the read-in control terminals 103 of the memories f and g are connected to the decoder 89 at that output terminal at which the respective identification is presented. That connection is effected by an AND gate 104 so that a read-in operation can be delivered only when the error detector 85 has not detected an error. For that purpose one input terminal of each AND gate 104 is connected by an inverter 105 to the output terminal of the error detector 85.

When one of the receiving units $c_1$ to $c_m$ receives an acknowledgment, the reception detector 80 delivers a control signal to the read-out control terminal 95 of the signal memory 79 and to an output unit 106 for indicating the consecutive number 1 to m of the acknowledgment loop b and of the receiving unit c. As a result, the received acknowledgment and the consecutive number of the receiving unit c which is receiving the acknowledgment are respectively applied via the data buses 107 and 108 to the memories $f_1$ to $f_n$ and $g_1$ to $g_n$ and are read into the memories f and g associated with the conveying element a transmitting the acknowledgment. By means of an inquiry unit 109, each of the memories f and the associated memory g may be selected via a decoder 110 and the contents of the selected pair of memories can be read out into corresponding output units 111 and 112. In response to the delivery of an identification to the inquiry unit 109, the consecutive number of the acknowledgment loop at which the identified conveying element is disposed and the acknowledgment transmitted by said conveying element will be indicated.

In response to the detection of an error, the error detector 85 will disable the read-in control terminals 103 of the memories f and g and delivers a read-in command to the control input 113 of an additional memory 114, which is connected to the ring counter 82 of the identification generator and stores the identification of the conveying element for which the error has been detected. The stored identification can be read out to a display 115. An error receipt generator 116 is operable to erase the contents of the memory 114.

What is claimed is:

1. In a signal message transmitting system comprising an elongated induction loop for transmitting signal messages,
    a stationary transmitting and receiving station including a transmitting section connected to said induction loop and operable to transmit the signal messages identifying code signals to said induction loop, and a receiving section adapted to receive acknowledgements of the received signal messages, and
    a plurality of mobile units equal in length and movable along a path of travel, said induction loop extending along said path and each one of the mobile units comprising a receiver inductively coupled to said induction loop and adapted to receive a respective one of said signal messages including a respective one of the code signals identifying said mobile unit, and a transmitter operable to transmit a respective one of the acknowledgments in response to the reception of the signal message by said receiver:
    the stationary transmitting and receiving station comprises an identifying signal generator which is controlled by said transmitting section and adapted to generate signals identifying respective ones of said mobile units in the same sequence as the corresponding identifying code signals transmitted by said transmitting section, but with a predetermined delay after the corresponding identifying code signals,
    a respective acknowledgment loop is associated with each mobile unit and extends along respective length portions of said induction loop, each acknowledgment loop being inductively coupled to said transmitter of each mobile unit and being equal in length thereto,
    the receiving section comprises a plurality of receiving units, each of which is connected to one of said acknowledgment loops and is adapted to receive said acknowledgment therefrom, and
    an evaluating circuit connected to said receiving units and arranged to receive said acknowledgments therefrom and also connected to said identifying signal generator and arranged to combine each of said acknowledgments with the signal identifying the mobile unit which has transmitted said acknowledgment.

2. In the system set forth in claim 1,
    an acknowledgment memory connected to each one of the receiving units for receiving the acknowledgment therefrom and storing the received acknowledgment, each memory having a read-out control terminal,
    an identifying signal memory in the evaluating circuit connected to each one of the receiving units for receiving the identifying signals and storing said signals, each identifying signal memory having a read-in control terminal and a read-out control terminal receiving the identifying signals in cyclic sequence
    an acknowledgment detector connected to each one of the receiving units and adapted to deliver a read-in command to a read-in control input connected to the associated read-in control terminal in response to the reception of an acknowledgment by the associated receiving unit, and
    a signal transmitting unit in the evaluating circuit connected to the read-out control terminals for delivering a respective signals thereto in response to a respective one of the identifying signals delivered to the signal transmitting unit.

3. In the system set forth in claim 2, wherein
    a monitoring device is connected to each of said receiving units and adapted to deliver a signal to a erase input terminal of the associated acknowledgment memory when the associated receiving unit has failed to receive an acknowledgment during a predetermined period of time,
    each of said receiving units has an output terminal,
    said evaluating circuit comprises an error detector having an input terminal and an output terminal,
    said evaluating circuit also comprises a modified OR gate having an output terminal of said error detector and a plurality of input terminals connected to the output terminals of said receiving units, said modified OR gate being arranged to deliver an output only when only one of its inputs is high,
    said evaluating circuit further comprising an error indicator connected to said output terminal of said error detector,
    each of said acknowledgment memories has an erase terminal,
    each of said monitoring devices has an output terminal,
    an inverter is provided, which has an input terminal connected to said output terminal of said error detector and also has an output terminal,
    said evaluating circuit also comprises a plurality of AND gates, each of which has an output terminal connected to said erase terminal of one of said acknowledgment memories, and a first input terminal connected to said output terminal of said inverter, and a second input terminal connected to the output terminal of the monitoring device associated with the corresponding receiving unit.

4. In the system set forth in claim 2, wherein
    a monitoring device is connected to each of said receiving units and adapted to deliver a signal to a erase input terminal of the associated acknowledgment memory when the associated receiving unit has failed to receive an acknowledgment during a predetermined period of time,
    each of said receiving units has an output terminal,
    said evaluating circuit comprises an error detector having an input terminal and an output terminal,
    said evaluating circuit also comprises a modified OR gate having an output terminal of said error detector and a plurality of input terminals connected to the output terminals of said receiving units, said modified OR gate being arranged to deliver an output only when only one of its inputs is high, said evaluating circuit further comprising an error indicator connected to said output terminal of said error detector, each of said monitoring devices has an output terminal, each of said acknowledgment detectors has an output terminal, said evaluating circuit comprises a plurality of AND gates, each of which has an output terminal, a first input terminal connected to said output terminal of one of said monitoring devices and a second input terminal connected to the output terminal of said error detector, and said evaluating circuit also comprises a plurality of OR gates, each of which has an output terminal connected to said read-in control terminal of one of said identification memories, a first input terminal connected to the output terminal of one of said acknowledgment detectors and a second input terminal connected to the output terminal of one of said AND gates.

5. In the system set forth in claim 1, wherein said evaluating circuit comprises a plurality of acknowledgment memories, which are equal in number to said movable units and each of which has a read-in control terminal and is adapted to store one of said acknowledgments received by said receiving units, a plurality of code signal generators are provided, each of which is associated with one of said receiving units and adapted to generate a code signal identifying the associated receiving unit, a plurality of code signal memories are provided, each of which is connected to one of said code signal generators and has a read-in control terminal, and means are provided for connecting the read-in control inputs of said code signal memories and the read-in control inputs of said acknowledgment memories to the output terminal of said identification generator in step with the generation of said identifying signals by said identifying signal generator.

6. In the system set forth in claim 5, wherein each of said receiving units has an output terminal, said evaluating circuit comprises an error detector having an input terminal and an output terminal, said evaluating circuit also comprises a modified OR gate having an output terminal of said error detector and a plurality of input terminals connected to the output terminals of said receiving units, said modified OR gate being arranged to deliver an output only when only one of its inputs is high, said evaluating circuit further comprising an error indicator connected to said output terminal of said error detector, an inverter is provided, which has an input terminal connected to said output terminal of said error detector and also has an output terminal, said identifying signal generator has a plurality of output terminals associated with respective ones of said receiving units and is operable to deliver different identifying signals at respective ones of its output terminals, and a plurality of AND gates are provided, each of which has an output terminal connected to the read-in control terminal of one of said acknowledgment memories and to the read-in control terminal of one of said code signal memories, a first input terminal connected to the output terminal of said inverter, and a second input terminal connected to that output terminal of said identifying signal generator which is associated with the same receiving unit as said one acknowledgment memory.

7. In the system set forth in claim 5, wherein each of said receiving units has an output terminal, said evaluating circuit comprises an error detector having an input terminal and an output terminal, said evaluating circuit also comprises a modified OR gate having an output terminal of said error detector and a plurality of input terminals connected to the output terminals of said receiving units, said modified OR gate being arranged to deliver an output only when only one of its inputs is high, said evaluating circuit further comprising an error indicator connected to said output terminal of said error detector, an inverter is provided, which has an input terminal connected to said output terminal of said error detector and also has an output terminal, said identifying signal generator has an output terminal, and an identification memory is connected to the output terminal of said identifying signal generator and has a read-in control terminal connected to the output terminal of said inverter.

8. In the system set forth in claim 5, wherein each of said acknowledgment memories has an erase input terminal and a monitoring device is connected to each of said receiving units and adapted to deliver a signal to said erase input terminal of the associated acknowledgment memory when the associated receiving unit has failed to receive an acknowledgment during a predetermined period of time.

9. In the system set forth in claim 1, wherein each of said receiving units has an output terminal, said evaluating circuit comprises an error detector having an input terminal and an output terminal, said evaluating circuit also comprises a modified OR gate having an output terminal of said error detector and a plurality of input terminals connected to the output terminals of said receiving units, said modified OR gate being arranged to deliver an output only when only one of its inputs is high, and said evaluating circuit further comprising an error indicator connected to said output terminal of said error detector.

* * * * *